3,151,121
DINITROPYRROLES
George Karmas, Bound Brook, N.J., assignor to Ortho Pharmaceutical Corporation, a corporation of New Jersey
No Drawing. Filed Aug. 10, 1962, Ser. No. 216,034
13 Claims. (Cl. 260—294.7)

The present invention relates to 1-substituted, 2,4-dinitropyrroles. Specifically, the new compounds may be represented by the following structural formula

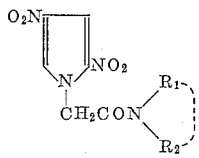

in which R is a substituent selected from the group consisting of hydrogen and alkyl radicals having no more than 4 carbon atoms. $R_2$ is a substituent selected from the group consisting of hydrogen and alkyl radicals having no more than 4 carbon atoms, and $R_1$ and $R_2$ taken together may form a group consisting of piperidine and pyrrolidine.

The compounds of the present invention have antimicrobial activity and more specifically are effective against *Trichomonas feotus*, a parasitic protozoan that infects the uterus of animals and causes abortion in cattle. The high order of trichomonodicidal activity possessed by the compounds of the present invention is quite surprising.

It is an object of the present invention to provide new compounds having therapeutic utility in the treatment of animals infected with *Trichomonas foetus*.

The following examples will serve to illustrate more fully the method of preparing the novel compounds of the present invention.

EXAMPLE I

1-Carbethoxymethyl-2,4-Dinitropyrrole

A mixture of 5 grams (0.0275 mole) of the sodium salt of 2,4-dinitropyrrole, 6 milliliters of ethyl chloroacetate and 10 milliliters of dimethylformamide is heated under reflux for two hours. The reaction mixture is cooled and poured with stirring into a mixture of 200 milliliters of water, 100 grams ice, and 15 grams of sodium carbonate layered with 150 milliliters of ether. This mixture is shaken vigorously and then the layers are separated. The ether solution is washed with 100 milliliters of 5% aqueous sodium carbonate, dried with anhydrous magnesium sulfate, concentrated, and then distilled. The 1-carbethoxymethyl-2,4-dinitropyrrole distills at 140–145° C. at 0.003 mm., and melts at 83–84° C.

EXAMPLE II

1-Carboxymethyl-2,4-Dinitropyrrole

To a cold (5° C.) solution of 5.2 grams (0.0214 mole) of 1-carbethoxymethyl-2,4-dinitropyrrole (prepared according to the process of Example I) in 150 milliliters of methanol is added 0.855 gram (0.0214 mole) of sodium hydroxide in 10 milliliters of water. To the resulting paste is added 200 milliters of water and this mixture is warmed at 45° C. for 10 minutes. After it has been cooled to 0° C., this solution is acidified with hydrochloric acid and the precipitated carboxylic acid is filtered off, washed on the filter with cold water, and dried in air. The 1-carboxymethyl-2,4-dinitropyrrole thus isolated, in almost quantitative yield, is hydrated. It melts at 205–207° C., after slow loss of water of hydration on the melting point stage.

Calcd. for $C_6H_5O_6N_3$: C, 33.50; H, 2.34. Found: C, 33.63; H, 2.60.

EXAMPLE III 1-(N,N-Diethyl)Acetamido-2,4-Dinitropyrrole

A mixture of 4.3 grams (0.0198 mole) of 1-carboxymethyl-2,4-dinitropyrrole hydrate (prepared as described in Example II) and 30 milliliters of thionyl chloride is boiled under reflux for 2½ hours and then concentrated under vacuum at 60° C. The dark oily residue is dissolved in 20 milliliters of toluene and reconcentrated under vacuum at 60° C. The residue is then leached with 100 milliliters of dry ether and the ether solution is decanted from a little tarry matter into a vigorously stirred solution of 3 milliliters of diethylamine in 70 milliliters of dry ether. After 2 hours of stirring at 25° C., 50 milliliters of water, 5 grams of sodium bicarbonate, and 100 milliliters of chloroform are added. The mixture is shaken vigorously and the layers are separated. After drying with magnesium sulfate, the ether solution is concentrated under vacuum. The residual dark solid is boiled briefly in 900 milliliters of water and the mixture is filtered while hot, after addition of 5 grams of Supercel. Supercel is a diatomaceous silica filter aid manufactured by Johns-Manville. Slow chilling of the filtrate to 0° C., affords 1-(N,N-diethyl) acetamido-2,4-dinitropyrrole as small buff flakes of melting point 102–103° C. The yield is 2.4 grams (51.9%).

Calcd. for $C_{10}H_{14}O_5N_3$: N, 20.73. Found: N, 20.82.

EXAMPLE IV 1-(N-Butyl)Acetamido-2,4-Dinitropyrrole

This compounds is prepared as described in Example III, using dry N-butylamine in place of diethylamine. The melting point is 133–134° C., after recrystallization from ethyl acetate, and the yield from an equal quantity of starting material is 2.3 grams (49.7%).

Calcd. for $C_{10}H_{14}O_5N_4$: N, 20.73. Found: N, 20.32.

EXAMPLE V 1-(N-Propylcarbamylmethyl)-2,4-Dinitropyrrole

A mixture of 5 grams of the sodium salt of 2,4-dinitropyrrole, 4.2 grams of N-propylchloracetamide, and 20 milliliters of dimethylformamide is boiled under reflux for fifteen minutes and then poured into 300 milliliters of cold 5% aqueous potassium carbonate. The insoluble solid is filtered off, dried in air and decolorized with charcoal in an acetone solution. The clear filtrate is evaporated to dryness and the solid residue is recrystallized from ethyl acetate to afford 4.8 grams (68%) of 1-(N-propylcarbamylmethyl)-2,4-dinitropyrrole as fine cream prisms which melt at 126–127°.

The experimental details and physical constants of other compounds of the present invention prepared according to the methods illustrated in Example I through V above, appear in Tables I and II. The constants of compounds not listed in Table II may be found in the detailed Example I through V.

TABLE I
*Preparation From Chloroacetamides*

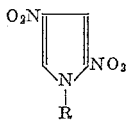

| R | Alkylating Agent | Reaction Conditions (in Dimethylformamide) | Yield, percent |
|---|---|---|---|
| $CH_2CONH_2$ | $ClCH_2CONH_2$ | 10 min. at 145° | 59 |
| $CH_2CONHCH_3$ | $ClCH_2CONHCH_3$ | 15 min. at 150° | 67 |
| $CH_2CON(CH_3)_2$ | $ClCH_2CON(CH_3)_2$ | 15 min. at 150° | 78 |
| $CH_2CONHC_2H_5$ | $ClCH_2CONHC_2H_5$ | 15 min. at 150° | 78 |
| $CH_2CONHC_3H_7$ | $ClCH_2CONHC_3H_7$ | 15 min. at 150° | 68 |
| $CH_2CONHC_3H_7$-i | $ClCH_2CONHC_3H_7$-i | 15 min. at 150° | 67 |
| $CH_2CONHC_4H_9$-i | $ClCH_2CONHC_4H_9$-i | 5 min. at 150° | 48 |
| $CH_2CON(C_4H_9)_2$ | $ClCH_2CON(C_4H_9)_2$ | 5 min. at 150° | 74 |
| $CH_3CON\begin{matrix}CH_2CH_2\\ \vert \\ CH_2CH_2\end{matrix}$ | $ClCH_2CON\begin{matrix}CH_2CH_2\\ \vert \\ CH_2CH_2\end{matrix}$ | 15 min. at 150° | 80 |
| $CH_2CON\begin{matrix}CH_2CH_2\\ \diagdown \\ CH_2CH_2\end{matrix}CH_2$ | $ClCH_2CON\begin{matrix}CH_2CH_2\\ \diagdown \\ CH_2CH_2\end{matrix}CH_2$ | 15 min. at 150° | 77 |

TABLE II
*Physical Constants of Carbamylmethyl-2,4-Dinitropyrroles of Table I*

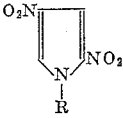

| R | B.P., °C./mm. | M.P., deg. | Analytical Calcd. | Found |
|---|---|---|---|---|
| $CH_2CONH_2$ | | 231–232 | 33.65C; 2.82H | 33.81C; 2.87H. |
| $CH_2CONHCH_3$ | | 167–168 | 36.85C; 3.53H | 37.09C; 3.72H. |
| $CH_2CON(CH_3)_2$ | | 140–141 | 39.67C; 4.16H | 39.70C; 4.20H. |
| $CH_2CONHC_2H_5$ | | 161–162 | 39.67C; 4.16H | 39.37C; 4.34H. |
| $CH_2CONHC_3H_7$ | | 126–127 | 42.19C; 4.72H | 42.28C; 4.64H. |
| $CH_2CONHC_3H_7$-i | | 176–177 | 42.19C; 4.72H | 42.38C; 4.63H. |
| $CH_2CONHC_4H_9$-i | | 133–134 | 44.44C; 5.22H | 44.76C; 5.41H. |
| $CH_2CON(C_4H_9)_2$ | | 127–128 | 51.52C; 6.80H | 51.42C; 6.69H. |
| $CH_2CON\begin{matrix}CH_2CH_2\\ \vert \\ CH_2CH_2\end{matrix}$ | | 158–159 | 44.78C; 4.51H | 44.75C; 4.54H. |
| $CH_2CON\begin{matrix}CH_2CH_2\\ \diagdown \\ CH_2CH_2\end{matrix}CH_2$ | | 152–153 | 46.81C; 5.00H | 47.31C; 5.17H. |

The in vitro trichomonadicidal activity of the compounds of the present invention may be demonstrated by a series of tests which establishes the minimal inhibitory concentration of these compounds. Minimal inhibitory concentration, as used above, is defined as the minimal concentration of a trichomonadicidal compound capable of preventing the growth of and killing *Trichomonas foetus* organisms introduced into a culture medium, capable alone of supporting a vigorous growth of the organisms and containing the trichomonadicidal compound to be tested. The culture medium used in the tests is described in a publication of Kupferberg, Johnson and Sprince, Proceedings of the Society for Experimental Biology and Medicine, volume 67, pages 304–308, 1948.

In making the tests to determine minimal inhibitory concentrations, 0.05 milliliter of a 48-hour culture of *Trichomonas foetus* is placed in a series of tubes containing 10 milliliters of the culture medium and increasing amounts of the compounds to be tested. The inoculated culture medium is then incubated at 37° C. for nine days and examined under magnification after two, five, seven, and nine days. The minimal inhibitory concentration of the compound tested is that concentration in the tube in which no viable organisms are present at the ninth day examination. If there are no viable organisms present on examination at a time less than nine days, the concentration of compound is greater than minimal and if there are viable organisms present at the ninth day examination, the concentration is less than minimal. The results of these tests appear in column 1 of Table III, wherein the concentration of the carbamylmethyl-2,4-dinitropyrroles is expressed in parts per million.

The toxicity of the compounds of the present invention are determined by oral administration to mice and may be determined from the in vivo data appearing in Table III. In column 2, under the heading $LD_{50}$, is indicated the quantity (in milligrams per kilogram of body weight) which is fatal to 50% of the mice tested. The amount (in milligrams per kilogram of body weight) required to cure 50% of the test animals injected with a lethal dose of *Trichomonas foetus* is indicated in column 3, under the heading $PD_{50}$. In this column, "N.P." indicates no protection. Column 4 of Table III reports the therapeutic index of these compounds.

TABLE III

*Trichomonadicidal Activity of Carbamylmethyl-2,4-Dinitropyrroles*

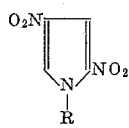

| R | In Vitro Activity, p.p.m. | In Vivo | | |
|---|---|---|---|---|
| | | $LD_{50}$ | $PD_{50}$ | T.I. |
| $CH_2CONH_2$ | 10.0 | 535–850 | 20 | 35.0 |
| $CH_2CONHC_4H_9$ | 1.0 | 4,000–5,000 | 50 | 100.0 |
| $CH_2CON(C_2H_5)_2$ | 1.0 | 1400 | 10 | 140.0 |
| $CH_2CONHCH_3$ | 1.0 | 755–1,050 | 7 | >76 |
| $CH_2CON(CH_3)_2$ | 1.0 | 535–755 | 7 | >76 |
| $CH_2CONHC_2H_5$ | 1.0 | 675–1,050 | 25–30 | >27 |
| $CH_2CONHC_3H_7$ | 1.0 | 1,050–2,150 | 25–30 | >42 |
| $CH_2CONHC_3H_7$-i | 1.0 | 535–675 | 16–20 | >33 |
| $CH_2CONHC_4H_9$-i | 1.0 | >2,150 | 45–50 | >48 |
| $CH_2CON(C_4H_9)_2$ | >20 | >535 | N.P. 535 | <1.0 |
| $CH_2CON\begin{smallmatrix}CH_2CH_2\\ \\CH_2CH_2\end{smallmatrix}$ | 2.0 | >2,150 | 45–50 | >43 |
| $CH_2CON\begin{smallmatrix}CH_2CH_2\\ \phantom{X}CH_2\\CH_2CH_2\end{smallmatrix}$ | 1.0 | >2,150 | 67 | >32 |

In employing the trichomonadicides of the present invention for the treatment of *Trichomonas foetus*, one or more of the active agents are uniformly distributed in a suitable chemotherapeutic vehicle that is chemically compatible with the particular trichomonadicide selected, noninhibiting with respect to the action of the effective agent upon *Trichomonas foetus* and essentially non-injurious to the vaginal mucosa under the conditions of use. The vehicle is preferably of a liquid or semi-liquid type. Furthermore, since the final preparation should be readily miscible with vaginal fluids, the vehicles, whether hydrous or anhydrous, are preferably water miscible or water-dispersible. The compositions of this invention may be in the form of suppositories, if desired.

The foregoing criteria for a vehicle in which the compounds of the present invention are incorporated may be met by a large number of semi-liquid chemotherapeutic vehicles that are well known in the art. Thus, for example, the vehicle may comprise semi-liquids that are colloidal in nature, especially those that are viscous and/or mucilaginous in character. Such vehicles are particularly suitable for use in topical treatment of *Trichomonas foetus* becaus of their inherent gelatinous and miscible nature which affords prolonged contact between the 1-substituted-2,4-dinitropyrrole and the infecting organism.

In order to disclose more clearly the manner of formulating the compounds of the present invention to topical application, several specific examples will hereinafter be described in considerable detail.

EXAMPLE VI

| | |
|---|---|
| Deionized water | 75.80 |
| Sodium carboxymethylcellulose | 3.00 |
| Polyethyleneglycol (molecular weight approximately 4000) | 15.00 |
| Propylene glycol | 5.00 |
| Para-hydroxy-benzoic acid methyl ester | 0.20 |
| 1-(N-propylcarbamylmethyl)-2,4-dinitropyrrole | 1.00 |

EXAMPLE VII

| | |
|---|---|
| Deionized water | 90.30 |
| Methyl cellulose | 3.50 |
| Glycerin | 5.00 |
| Para-hydroxy-benzoic acid methyl ester | 0.20 |
| 1-(N-isobutylcarbamylmethyl)-2,4-dinitropyrrole | 1.00 |

EXAMPLE VIII

| | |
|---|---|
| Deionized water | 80.80 |
| Pectin | 8.00 |
| Propylene glycol | 10.00 |
| Para-hydroxy-benzoic acid methyl ester | 0.10 |
| Para-hydroxy-benzoic acid propyl ester | 0.10 |
| 1-(N-methylcarbamylmethyl)-2,4-dinitropyrrole | 1.00 |

The trichomonodicidal formulations of Examples VI through VIII are prepared according to the following general procedure in which two initial solutions are mixed to make the formulation, all the parts being given by weight. To prepare Solution A, dissolve the para-hydroxy-benzoic acid methyl ester in about two-thirds of the hot deionized water, cool to about 170° F., and, while stirring, add the gel-forming ingredient and glycerine or propylene glycol. To prepare Solution B, add the trichomonadicidal agent to the remainder of the deionized water, and adjust the pH to the desired value. The formulation is prepared by adding Solution B to Solution A in a slow stream with good stirring; stirring is continued for at least one hour.

Certain compounds of the present invention have also been found to be effective against enterohepatitis (blackhead) when administered by admixture, suspension, or dispersion in the food and/or drink normally partaken by turkeys, such as grain, mash, scratch, water or other liquids.

The general range of concentration of the 1-substituted-2,4-dinitropyrrole in the total substance is from about 0.05% or less to about 1%. The optimal concentration for effective therapy is in the range from about 0.05% to about 0.2% of the total food or drinking water. With these optimal concentrations, the daily drug intake for infected birds varies from about 20 milligrams of drug per kilogram of body weight to about 400 milligrams of drug per kilogram of body weight. In general, the precise dosage depends on the particular compound and the severity of the infection. Many of the compounds of the present invention may be administered in the concentrations indicated above with little or no toxic effects.

Various changes and modifications of the invention may be made and to the extent that such variations incorporate the spirit of this invention, they are intended to be included within the scope of the appended claims.

This application is a continuation-in-part of my copending applications Serial No. 23,383, filed April 20, 1960, now abandoned, Serial No. 124,767, filed July 18, 1961, and Serial No. 210,199, filed July 16, 1962.

What is claimed:

1. A compound of the formula

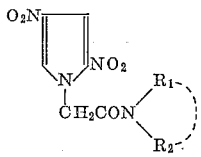

in which $R_1$ is a substituent selected from the group consisting of hydrogen and alkyl having no more than four carbon atoms, $R_2$ is a substituent selected from the group consisting of hydrogen and alkyl having no more than four carbon atoms, and $R_1$ and $R_2$ taken together may form a group consisting of piperidine and pyrrolidine.

2. A compound of the formula

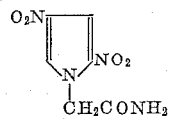

3. A compound of the formula

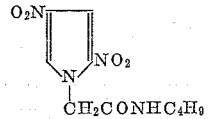

4. A compound of the formula

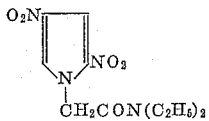

5. A compound of the formula

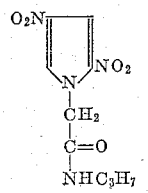

6. A compound of the formula

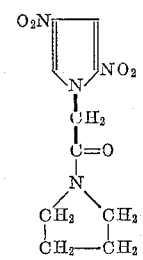

7. A compound of the formula

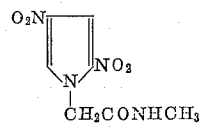

8. A compound of the formula

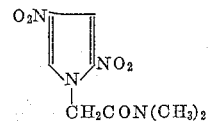

9. A compound of the formula

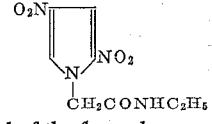

10. A compound of the formula

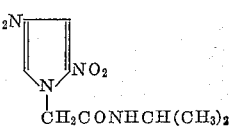

11. A compound of the formula

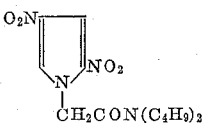

12. A compound of the formula

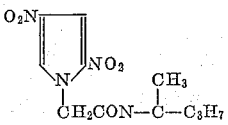

13. A compound of the formula

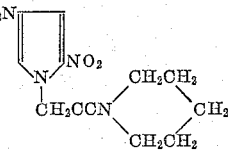

No references cited.

UNITED STATES PATENT OFFICE
CERTIFICATE OF CORRECTION

Patent No. 3,151,121            September 29, 1964

George Karmas

It is hereby certified that error appears in the above numbered patent requiring correction and that the said Letters Patent should read as corrected below.

Column 2, line 35, for "$C_{10}H_{14}O_5N_3$" read -- $C_{10}H_{14}O_5N_4$ --; line 40, for "compounds" read -- compound --; column 8, lines 53 to 59, the formula should appear as shown below instead of as in the patent:

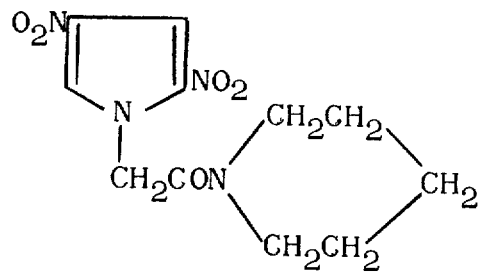

Signed and sealed this 2nd day of February 1965.

(SEAL)
Attest:

ERNEST W. SWIDER
Attesting Officer

EDWARD J. BRENNER
Commissioner of Patents